United States Patent [19]

Demerritt et al.

[11] Patent Number: 5,274,502
[45] Date of Patent: Dec. 28, 1993

[54] MOLDED LENS WITH INTEGRAL MOUNT AND METHOD

[75] Inventors: Jefferey A. Demerritt, Painted Post; Mark L. Morrell, Horseheads; Robert V. Vandewoestine, Corning, all of N.Y.

[73] Assignee: Corning Incorporated, Corning, N.Y.

[21] Appl. No.: 785,467

[22] Filed: Oct. 31, 1991

[51] Int. Cl.⁵ ................................................ G02B 7/02
[52] U.S. Cl. ...................................... 359/642; 359/808; 359/811
[58] Field of Search ................... 228/121, 227, 263.12; 65/40, 43, 57, 104, 275, 319; 362/61, 267; 174/50.4–; 359/619–

[56] References Cited

U.S. PATENT DOCUMENTS

| | | | |
|---|---|---|---|
| 3,912,400 | 10/1975 | Luebkeman | 359/642 |
| 4,162,826 | 7/1979 | Beck et al. | 359/894 |
| 4,362,819 | 12/1982 | Olszewski et al. | 501/44 |
| 4,391,915 | 7/1983 | Meden-Piesslinger et al. | 501/48 |
| 4,435,200 | 3/1984 | Joormann et al. | 65/102 |
| 4,439,529 | 3/1984 | Joormann et al. | 359/642 |
| 4,447,550 | 5/1984 | Leroy et al. | 501/75 |
| 4,481,023 | 11/1984 | Marechal et al. | 65/64 |
| 4,537,473 | 8/1985 | Maschmeyer | 305/432 |
| 4,684,222 | 8/1987 | Borrelli et al. | 359/671 |
| 4,891,053 | 1/1990 | Bartman et al. | 65/64 |
| 4,952,026 | 8/1990 | Bellman et al. | 359/619 |

FOREIGN PATENT DOCUMENTS

| | | | |
|---|---|---|---|
| 57307 | 4/1985 | Japan | 359/642 |
| 37309 | 2/1988 | Japan | 359/642 |
| 3-167514 | 7/1991 | Japan . | |
| 3-237023 | 10/1991 | Japan . | |

Primary Examiner—Martin Lerner
Assistant Examiner—Thong Nguyen
Attorney, Agent, or Firm—Kees van der Sterre

[57] ABSTRACT

Sealed precision optical assemblies are provided by a mold-in-place (MIP) process wherein a glass preform for a lens or other optical element is molded and sealed directly into a one-piece metal support for the element in a single precision molding step. The product is a sealed glass/metal assembly incorporating a non-interlocking mechanical seal, the seal being hermetic yet free of supplemental sealing materials, and the optical axis of the glass element being at a precise predetermined location and in a predetermined alignment relative to one or more reference surfaces on the metal support.

8 Claims, 1 Drawing Sheet

MOLDED LENS WITH INTEGRAL MOUNT AND METHOD

The present invention relates to precision optics and more particularly to molded-in-place (MIP) optical assemblies comprising a glass optical element such as a lens molded within and sealed directly, and preferably hermetically, to a metal lens mounting. The sealed assemblies are mechanically durable and offer precise optical alignment at reduced cost. They therefore greatly simplify the fabrication of hermetically sealed precision optical components such as solid state laser emitters and detectors for optical telecommunications and other optical applications.

The manufacture of glass optical lenses via the conventional grinding and polishing of glass blanks is slow and expensive. This is particularly true for small lens assemblies or lens designs such as aspheric lens designs requiring complex and expensive equipment for generating the surface figure of the lens.

Mainly for these reasons, effort is currently focussing on the development of processes for directly molding precision optical elements to final surface configuration and quality. Such processes are most easily adapted to the production of plastic lenses, but have also proven workable for the molding of special glass lens compositions as well.

Plastics have the inherent disadvantage of high susceptibility to scratching and a tendency to develop bulk or surface haze. In addition, they are subject to optical distortion from applied mechanical stress, humidity or heat.

In contrast, glass is relatively chemically inert, is dimensionally more stable than plastic, and is more nearly impervious to permeation by moisture or gas. Glass is also sufficiently thermally durable to be amenable to antireflection or other coating at high temperatures without damage, if necessary. Thus great interest in the further development of direct molding technology for glass lenses is continuing.

One commercially attractive approach to the production of glass lenses by direct pressing is described in U.S. Pat. No. 4,481,023. That patent shows methods and apparatus by which lenses of finished surface quality may be directly pressed in glass. Processes of this type are characterized as high-viscosity, isothermal molding processes. Molding is typically carried out at relatively low temperatures, i.e., at glass viscosities somewhat higher than the conventional glass softening point ($10^{7.6}$ poises), and the molds and glass preform are generally maintained at approximately the same temperatures during the pressing stage of the process.

Glass compositions particularly well suited for direct lens pressing as described have also been developed. U.S. Pat. No. 4,362,819, for example, discloses glass compositions capable of being molded at relatively low temperatures to high surface quality, and which provide lenses offering good chemical durability and excellent resistance to weathering.

The use of high temperature molding to form glass lenses is also known, as shown, for example by U.S. Pat. Nos. 4,435,200 and 4,891,053. In the latter patent, a two-piece telescoping metal support forming an interlocking seal with the molded glass element is provided, the seal being formed by extruding a portion of the glass into an annular gap between the telescoping metal supports. Interlocking with the inner metal support is achieved by glass flow around and outside of that support during molding, this flow providing an annular glass seal segment extending around the periphery of the inner support.

The extensive glass flow needed for this type of sealing requires low glass viscosities and molding temperatures well above the glass softening point. Unfortunately, molding at these high temperatures makes the achievement of an accurate lens surface figure much more difficult, and is also more expensive in terms of energy usage and the significant reductions in mold life unavoidably caused thereby.

Through advances in glass composition and mold design, and given close attention to mold release characteristics, molded glass elements of excellent surface quality and optical figure can be made by lower-temperature high viscosity isothermal molding as previously described. However, the subsequent handling of such molded glass optics, and the optical alignment and fixing thereof in the optical assemblies or sub-assemblies wherein they are ultimately used, continues to be a problem.

One difficulty relates to the need for precision positioning and sealing of lens elements into an optical system, which can be labor-intensive and thus expensive. For example, in optical subsystems of the kind used in optical telecommunications applications, e.g., optical emitters, detectors, or focused optical fiber connectors, lens misalignment on the order of a few microns can drastically reduce performance and thus the value of a costly sealed optical device. For these reasons, optical alignment aids such as mechanical reference surfaces on the lenses are useful; U.S. Pat. No. 4,537,473 discloses lenses featuring such surfaces.

In communications systems employing solid state electronic optical sources, detectors, amplifiers, or the like, the hermetic sealing of the lens to the package incorporating the electronic device is a further important feature. Again however, the hermetic sealing of molded glass optics to device packages, which are typically formed of metals, can require expensive processing. Often the metallization of selected lens surfaces and the subsequent soldering of the lens to the package are required.

Hermetic seals have also been thought to benefit from a close match in thermal expansion between the glass of the lens and the metal to which it is to be sealed. In cases where lens or metal composition constraints prevented such matching, "graded seals" employing special sealing glasses intermediate in thermal expansion between the lens and metal were often prescribed. Alternatively "compression" seals involving mechanical arrangements wherein the glass components could at all times be maintained under compression were designed. Each of these approaches added to the cost and complexity of the resulting sealed lens assembly.

SUMMARY OF THE INVENTION

The present invention provides an improved optical subassembly, and a method for making it, wherein a molded glass optical element such as a lens is permanently sealed within a metal support. The key feature of the invention is that the lens or other optical element is directly molded and sealed into the support at relatively low temperatures during lens manufacture. This permits one-step optical finishing, optical alignment, and sealing of the lens into the support during the lens molding process.

In a first aspect, then, the invention includes an integral optical assembly comprising a molded optical element formed of a glass, the glass optical element being positioned within and circumferentially sealed to an encircling or circumferential support member formed of a metal. The metal support is typically a one-piece support, and the seal provided between the support and the molded optical element is a non-interlocking seal. By a non-interlocking seal is meant a seal wherein no portion of the glass extends exteriorly of the periphery of the metal support member, i.e., there is no envelopment of any peripherial portion of the metal support by the glass.

The seal formed in accordance with the invention is further characterized as a mechanical seal, and in the preferred embodiments as a mechanical seal which is also a hermetic seal. By a mechanical seal is meant that the glass physically adheres to the metal support after molding of the optical element, such adherence being sufficient to form a mechanically durable glass/metal assembly. The more preferred hermetic seals are thought to involve chemical bonding between the glass and the metal across the entire glass/metal seal interface.

The mechanical seal obtained in accordance with the invention provides a durable mechanical assembly without the need to provide a geometrically interlocking interface between the metal and the glass. Obtaining sealing without a mechanical interlock is critical since the molding temperatures typically used for finished lens manufacture are not high enough to permit extensive glass flow. Mechanical sealing also avoids the need to design the support for a compression or interference fit with the glass, which can damage the lenses. In fact, we find that exact thermal expansion matching between the glass and metal is not required if a good mechanical seal can be obtained.

Most typically, the seal is a butt, lap, or combination butt-and-lap seal characterized by good glass-to-metal adherence and, in the preferred embodiment, hermetic sealing between the glass and metal. In all cases, the seal interface between the glass and metal will be substantially free of supplemental organic and inorganic sealing materials, i.e., the seal interface consists essentially only of the metal forming the support, the glass forming the lens or other optical element, and any by-products of chemical interaction therebetween.

In a second aspect, the invention comprises a method for making a sealed precision optical assembly by a direct molding or so-called mold-in-place (MIP) process. In accordance with that method, a metal support for a glass optical element such as a lens, which support comprises an opening adapted to receive the glass element, is first provided. Also provided is a glass preform for the optical element having dimensions permitting preform insertion into the opening in the support. The glass will be of a composition selected to have good low temperature sealing compatibility with the metal, meaning that it will exhibit good adherence to the metal upon contact therewith at temperatures below the glass softening point.

The glass preform, positioned within the opening in the support, is then placed into a molding chamber, and the preform and at least adjacent portions of the support are heated to a temperature above the glass annealing point but below the glass softening point of the glass preform. The chamber contains at least one and typically two opposing glass-forming molds, these molds having molding surfaces of a configuration adapted to mold the preform into an optical element of a preselected surface figure.

The glass preform and adjacent portions of the metal support are then heated to a temperature above the glass annealing point but below the glass softening point of the glass preform, and molding pressure is applied to the glass preform for a time at least sufficient to force the glass into intimate sealing contact with the metal support, and to conform the surfaces of the glass preform to the configuration of the molding surfaces. The molds, which are preferably also preheated, will generally have a surface finish adequate to produce a finished optical surface on the glass so that, at the conclusion of the pressing step, a sealed glass/metal optical assembly comprising a finished glass lens or other element sealed to the metal support is provided.

As can readily be appreciated, the molding chamber may have provisions for holding the metal support member in a precise alignment with respect to the glass element to be formed therein. Accordingly, the lens or other glass element may be molded with its optical axis in predetermined alignment and at a predetermined location with respect to the metal lens support member. This relative positioning of the lens may be secured with reference to any selected surface portion of the support member, such that the selected surface portion may thereafter serve as a convenient reference surface for assembling the lens or other element in precise alignment within a larger optical system.

Unexpectedly, sealed optical assemblies provided as described are found to exhibit excellent hermeticity and mechanical durability even in cases where the glass is somewhat higher in thermal expansion (exhibits larger thermal shrinkage during cooling after molding) than the metal support. The seal quality achieved by this process is quite unexpected in view of the fact that the pressing and sealing step is carried out at relatively low temperatures and high glass viscosities. In addition, the integral lens/support assemblies of the invention exhibit low optical distortion as made, and should offer low thermally induced distortion in harsh use environments.

Finally, due to the capability of providing precise optical alignment of the lens or other optical element witnin the metal support, proper positioning of the support within any optical system to receive the mounted lens insures accurate optical positioning of the lens as well. This greatly simplifies manufacturing for optical devices wherein close dimensional and optical tolerances must be maintained.

DESCRIPTION OF THE DRAWINGS

The invention may be further understood by reference to the drawings, wherein.

DETAILED DESCRIPTION

Figure 1:
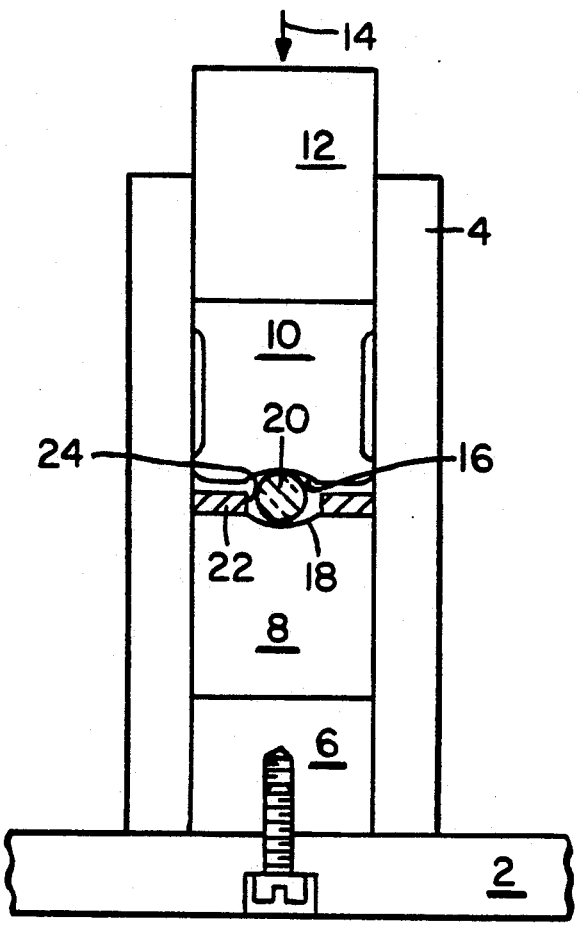
FIG. 1 shows apparatus for the manufacture of an integral optical assembly in accordance with the invention.

As previously stated, precision molded optical elements must maintain very low levels of distortion in use. A particular advantage of the invention is the capability to reproducibly provide finished lens distortions of less than 0.04 waves RMS as measured at 633 nm at room temperature. This level of distortion is at least as low as customarily achieved utilizing conventional prior art metallization/soldering, frit sealing, or chemical cementing to produce a finished molded lens/metal support assembly, yet is achieved at greatly reduced cost.

Known isothermal molding processes such as disclosed in U.S. Pat. No. 4,481,023 are capable of producing lenses of the required low distortion, and are readily adaptable to the production of MIP lens assemblies in accordance with the invention. Therefore, these processes are preferred. Conventional high-temperature molding processes such as customarily used for the pressing of glass containers or ophthalmic lens blanks risk the development of chill wrinkles in the surfaces of the pressed lenses, although with careful process control they may find limited application in the invention.

While the invention is not limited in its application to any particular glass composition or glass composition type, a number of glasses previously developed for the direct molding of optical elements and known to the art may be successfully employed. Among the known glasses which could be used in our direct molding process are glasses of alkali phosphate, alkali fluorophosphate, alkali aluminophosphate, and alkali aluminofluorophosphate type. The preferred glasses will generally have glass softening temperatures below about 500° C., more preferably below 400° C.

Particularly preferred are alkali aluminofluorophosphate glasses, optionally comprising significant proportions of divalent metal oxides, exhibiting moderate softening temperatures in combination with improved glass stability and good chemical durability. U.S. Pat. No. 4,362,819 provides specific examples of such preferred glasses.

U.S. Pat. No. 4,391,915 discloses other moldable phosphate glasses useful for the production of molded lenses, while U.S. Pat. No. 4,447,550 describes glasses of lead borosilicate composition which also exhibit relatively low softening temperatures and could alternatively be used.

A characteristic feature of many of these known moldable glass compositions is a relatively high average linear coefficient of expansion over the temperature range from the set point of the glass (the glass transition temperature) to room temperature. These relatively high expansion coefficients make the production of matched or compressive seals to circumferential metal supports somewhat problematical, since many of the chemically durable and refractory metals have lower expansion coefficients and thus lower thermal shrinkage than the glass over this temperature range.

Unexpectedly, the invention can provide completely leak-proof (hermetic) seals with some of these metals even though the coefficients of expansion between the metal and glass are not well matched, and even in cases where calculations indicate that the seals are under tension. Thus, selection of the metal for the lens support can be made mainly on the basis of a simple test of glass/metal adherence at temperatures below the glass softening point, rather than entirely on the basis of relative thermal expansion coefficients.

Among the metals which are preferred for the fabrication of metal supports for use in the invention are the austenitic stainless steels and brass. These metals have been found capable of directly forming hermetic seals with the preferred glass compositions during the low-temperature isothermal molding procedures we customarily use to form these lenses. Other sealingly compatible metal supports, if not too diverse from the selected lens glass in terms of thermal expansion, should also be capable of hermetic sealing with the preferred alkali phosphate glasses. Again, no supplemental sealing compositions, whether of glass, metal or other types, are needed or desired.

As previously suggested, the seals formed between the particularly preferred glass and austenitic stainless steel support materials in accordance with the invention are properly characterized as tensional seals, i.e., with the glass lens and at least the inner annulus of the metal support member in radial tension. From an optical performance perspective, however, this seal apparently has no adverse effect whatever on the optical quality of the lenses and, as also previously noted, the hermetic performance of these seals is particularly surprising and beneficial.

Other metals can be substituted for the preferred brass and stainless steel metal supports, particularly where hermetic sealing with the molded lens is not required. Examples of such other metals include the 400 series stainless steels. In some cases pretreatment of the metal surface to improve bonding characteristics to the glass, including for example surface oxidation treatments to form an oxidized metal surface, may be advantageously employed. However, even for hermetic sealing applications this is not always required.

The process of the invention can utilize essentially any physical configuration for the metal support, including metal rings, perforated disks, metal tube supports, perforated cups, or other designs. For many applications, threaded or smooth sleeve elements, whether symmetric or asymmetric, would constitute useful supports for the direct pressing and sealing of optical assemblies as described. In all of these cases, successful use merely requires that the molds utilized for the direct pressing of the lens-support combination be adapted in shape. This may be done through mold redesign to accommodate the metal support, in addition to the glass preform for the lens, within or partially within the molding chamber. In the case of relatively large tubular or sleeve-type supports, the support itself can form part of the molding enclosure.

The invention may be further understood by reference to the following illustrative Example detailing the direct molding of an integrated and hermetically sealed lens-metal support assembly in accordance therewith.

EXAMPLE 1

Apparatus for molding an integral glass/metal optical assembly in accordance with the invention may be largely conventional. The molding apparatus illustrated in FIG. 1 of the drawing is suitable. As shown in FIG. 1, the apparatus comprises a mold base 2 upon which is supported a sleeve 4 and a sleeve post 6, the post being fastened to the base and supporting the sleeve.

Within sleeve 4 are positioned lower mold 8 and upper mold 10, these molds suitably consisting of glass but alternatively being formed of metal or other refractory inorganic material. Also disposed within sleeve 4 is mold plunger 12 which is adapted to apply pressure in the direction of arrow 14 to the molds in the sleeve. The pressure may be applied mechanically, pneumatically, hydraulically, or by any other suitable means.

Surface 16 on mold 10 and surface 18 on mold 8 are shaped to a surface figure corresponding (with appropriate adjustments for thermal effects) to that required in the molded lens to be formed in the apparatus, and also a surface finish sufficient to form an optical quality surface thereon, in accordance with known practice. Suitably, molds 8 and 10 may be fabricated following known procedures utilizing Schott F6 optical glass. Sleeve 4 may be made from tungsten carbide, and base 2, support post 6 and mold plunger 12 from stainless steel.

A lens to be molded in the apparatus described will be formed from a glass preform of appropriate size and shape, shown in FIG. 1 of the drawing as glass lens preform 20. Preform 20 consists of a volume of glass sufficient to form a lens having surface curvatures corresponding to the surfaces of the mold, while at the same time completely filling the void volume within the metal support ring, when softened and shaped during the molding process. The volume is also sufficient to insure that the softened glass is brought into intimate sealing contact with circumferential inner surface 24 of the metal support ring 22 during molding.

In the present Example the glass used to shape lens preform 20 is an alkali aluminofluorophosphate optical glass having a composition, in weight percent, of about 30 39.2 $P_2O_5$, 5.0 $Na_2O$, 4.3 F 24.2 PbO, 20.1 BaO, 2.0 $Li_2O$, and 5.2 $Al_2O_3$. The lens preform is spherical and has a diameter of approximately 5 mm. The metal used in metal lens support 22 is Type 304L stainless steel, the ring having an inside diameter of about 0.250" (6.4 mm), an outside diameter of about 0.6" (15.2 mm), and a thickness of about 0.062" (1.6 mm).

The glass and metal compositions selected for this lens assembly are not closely matched in thermal expansion. The stainless steel for the support has an average linear thermal expansion coefficient of about $178 \times 10^{-7}/°$ C. over the temperature range of 25°–300 ° C. On the other hand, the glass has an average linear thermal expansion coefficient of about $202 \times 10^{-7}/°$ C. over the range from about the glass transition temperature or set point to room temperature.

The determination of glass expansion is made by a careful comparison of the projected dimensions of the mold cavity at the molding temperature of the glass and the dimensions of the molded lens at room temperature, since accurate dimensional determinations cannot conveniently be made on the glass at elevated temperatures. Nevertheless, these measurements are deemed sufficient to suggest that residual radial tension in the seal area is probably present in the molded glass/support product.

The simultaneous molding and sealing of the glass preform to the support ring are carried out by placing the entire molding assembly into an electrically-powered forced gas recirculation oven. The oven chamber is then purged with nitrogen and the molding assembly including the molds, preform, and ring are heated under nitrogen to a peak molding temperature of about 375 ° C. over a heating interval of about 100 minutes.

After the peak molding temperature is reached, a pressing force of about 5 lbs (2.3 kg) is applied to mold plunger 12 in the direction of arrow 14. This force, applied for an interval of about 5 minutes, is sufficient under the isothermal molding conditions described to complete the shaping of the glass preform and to seal it intimately to support ring 22.

At the end of the pressing cycle, the mold plunger is retracted from the sleeve, the oven damper is opened, and cooling of the molding assembly, in the nitrogen atmosphere of the furnace, is allowed to occur over a cooling interval of about 80 minutes. Thereafter the molding assembly is removed from the oven and the lens support assembly is removed and inspected.

Figure 2:
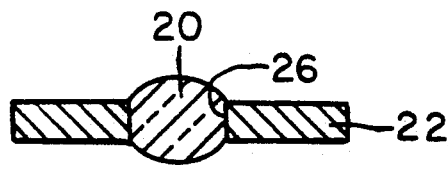
FIG. 2 shows an integral optical assembly comprising a lens hermetically sealed to a metal ring support in accordance with the invention.

Lens assemblies produced in accordance with the described procedure have a configuration as shown in FIG. 2 of the drawing, wherein molded lens 20 is directly sealed within metal support ring 22. These assemblies are both mechanically durable and optically precise.

Hermetic sealing of the lens to the support member is dependably obtained and, as described in the following example, the resulting seal is both permanent and optically neutral. Thus no optical distortion attributable to molding the lenses directly into the support rings is seen.

EXAMPLE 2

The procedure of Example 1 is repeated, except that the molded lens is sealed into a metal lens support having the form of a steel cup with a perforated or open bottom adapted to receive the lens. This support is again fabricated from Type 304L stainless steel, having a circular bottom opening about 0.118 inches (3.0 mm) in diameter and a bottom thickness of about 0.100 inches (2.5 mm). The maximum outer diameter of the metal support at the cup lip of the cup is about 0.4 inches (10 mm). The glass used to form the lens in the support opening has the same composition as that utilized in Example 1 above.

Direct molding of the lens within the metal support is carried out in an induction-heated, atmosphere-controlled molding press. This apparatus includes optically finished upper and lower molds fabricated from electroless nickel-plated tool steel, these molds being movably disposed within a close-fitting circumferential tungsten carbide sleeve to form a molding chamber. The sleeve is positioned on a stainless steel base which also supports the lower mold.

The glass preform for the described lens assembly is a glass sphere having a diameter of about 0.108 inches (2.7 mm). This preform and a metal lens support cup as described are positioned within the sleeve on the lower mold block and covered by the upper mold. This assembly is then positioned within an induction coil and induction-heated, with continuous nitrogen purging of the molding chamber, to a molding temperature of about 375 ° C.

After the molding temperature is reached, a molding force of about 50 lbs. (23 kg) is applied to the upper mold for about 1 minute, this force being sufficient to both shape the lens preform to final figure and to seal it hermetically into the opening in the steel support cup. At the end of this pressing cycle the pressure is released, the induction coil is de-energized, and the molded lens assembly is cooled in the molding chamber under nitrogen for a cooling interval of about 3 minutes.

At the completion of this procedure the top mold is extracted from the sleeve and the lens assembly is removed for examination and testing. This product has a cross-sectional configuration approximating that shown in FIG. 3 of the drawing, which is a schematic elevational view in cross-section of such an assembly, although not in true proportion or to scale. As in FIG. 2, the seal 26 obtained between lens 20 and the metal support member (steel cup 28 in FIG. 3) is hermetic.

Optical measurements performed on 12 molded lens assemblies produced in accordance with Example 2 show very low optical distortion. ZYGO interferometer values average approximately 0.033 waves RMS at 633 nm for lenses of this size. These results compare very favorably with the results of identical measurements on lenses similarly fabricated, but without the sealing of the lenses to metal support during molding. In the latter case, distortion values averaging 0.041 waves RMS for the unsupported lenses are not uncommon. We have thus concluded that the fusion of appropriate metal supports to these lenses during molding does not introduce added distortion to the lens assembly.

The level of hermeticity achieved in direct molding in accordance with the invention is demonstrated by helium leak testing of the molded lens/support assemblies. Ten qualifying assemblies produced in accordance with Example 2 are evaluated using a Varian 936-40 helium leak detector calibrated to a reference helium flow of $1.6 \times 10^{-7}$ cc/sec. Nine of the ten lenses showed no detectable helium leak at the $10^{-8}$ cc/sec helium release level.

The hermetic seals produced by employing direct molding as described were also found to be quite stable against seal degradation under thermal cycling. Hence, thermal cycle tests on these assemblies, involving repeated rapid cooling and heating over the 0°-100° C. temperature range, did not increase the helium leak rate of any of the hermetically sealed samples.

While the lens assemblies described in the above Examples illustrate particularly preferred glass and metal support materials for the production of strong, hermetically sealed optical devices, alternative materials can also yield useful results. Depending on the materials selected, either hermetically sealed lens/support assemblies or assemblies exhibiting good mechanical integrity but not hermetic sealing may be provided.

Table I below sets forth data respecting various metals which have been successfully utilized for the fabrication of metal lens supports for direct molding in accordance with the invention. Reported in Table I for each of the metals shown is information relating to the composition and/or levels of metallic trace or impurity components present in each case, together with average linear thermal expansion values for each metal over the temperature range of 25°-300° C., as taken from the literature.

TABLE I

| Metal | Thermal Expansion | Compositions |
|---|---|---|
| 304L stainless steel | $178 \times 10^{-7}$ | Fe + 2.0 Mn, 1.0 Si, 18-20 Cr, 8-12 Ni. |
| Inconel 718 nickel-steel alloy | $142 \times 10^{-7}$ | Fe + 50-55 Ni, 17-21 Cr, 4.75-5.4 Nb + Ta, 2.8-3.0 Mo. |
| cold-rolled steel | $135 \times 10^{-7}$ | Fe + 0.06 C, 0.38 Mn. |
| 420 stainless steel | $108 \times 10^{-7}$ | Fe + 12-14 Cr, 1.0 Mn, 1.0 Si, 0.15 C. |
| Cartridge brass | $199 \times 10^{-7}$ | 70 Cu, 30 Zn. |

The above metals are considered to be merely illustrative of the range of metal support materials which might usefully be employed in the invention. Perhaps the most important common characteristic of these and other metals to be selected is that of adhering strongly to the glass to be used for molding the lens element to the support. For some metals, this may require that surface preparation of the metal, e.g., a surface oxidation treatment or the like, be used to improve glass-metal adherence. For other metals, including both brass and some of the preferred stainless steel supports, such surface preparation is normally not required.

As previously suggested, the invention does not appear to be limited to any particular family of directly moldable optical glasses, especially where simple mechanical rather than hermetic sealing is required. Table II sets forth some representative glass compositions which might be used to produce durable lens/support assemblies employing metal support materials such as shown in Table I. Included in Table II are glass transition temperature and annealing point values for each of the glasses, as well as thermal expansion coefficients expressed as average values over the temperature range from 20°-300° C. The expansion values reported in Table II are somewhat below the expansion values which would be determined over the broader range from the set point of the glass to room temperature. Thus, for example, the average thermal expansion value of glass 1 from Table II over the temperature range from 25° C. to the glass transition temperature has been determined to be about $202 \times 10^{31}$ 7/° C.

TABLE II

| Glass Component | Glasses | | |
|---|---|---|---|
| | 1 | 2 | 3 |
| Li$_2$O | 2.0 | 1.87 | 1.8 |
| Na$_2$O | 5.0 | 4.44 | 4.4 |
| K$_2$O | — | 4.22 | 4.1 |
| ZnO | — | 18.0 | 14.3 |
| CaO | — | 3.76 | 3.7 |
| BaO | 20.1 | 10.3 | 10.1 |
| Sb$_2$O$_3$ | — | 12.4 | — |
| PbO | 24.2 | — | 16.6 |
| Al$_2$O$_3$ | 5.2 | 0.5 | 1.3 |
| P$_2$O$_5$ | 39.2 | 44.5 | 43.6 |
| F | 4.3 | — | — |
| Transition Temperature | 330° C. | 326° C. | 330° C. |
| Annealing Temperature | 317° C. | 312° C. | 315° C. |
| Thermal Exp. Coefficient (20°-300° C.) | $150 \times 10^{-7}$ | $158 \times 10^{-7}$ | $161 \times 10^{-7}$ |

Each of the glasses shown above in Table II may be directly sealed to metal supports fabricated from the metals shown in Table I. The products will consist of mechanically durable sealed lens assemblies featuring a good mechanical seal between the glass and metal, although the glass may or may not be hermetically sealed to the support. Table III below sets forth additional examples of molded lens assemblies made using the metals and glasses of Tables I and II above, employing a molding procedure substantially as described in Example I above.

TABLE III

| | Sealed Lens/Support Assemblies | | |
|---|---|---|---|
| Example | Metal Support | Glass (Table II) | Seal Type |
| 2 | 304 stainless | 1 | hermetic |
| 3 | 304 stainless | 2 | hermetic |
| 4 | 304 stainless | 3 | hermetic |
| 5 | Inconel alloy | 1 | mechanical |
| 6 | Inconel alloy | 2 | mechanical |
| 7 | Inconel alloy | 3 | mechanical |
| 8 | Rolled steel | 1 | mechanical |
| 9 | Rolled steel | 2 | mechanical |
| 10 | Rolled steel | 3 | mechanical |
| 11 | 420 stainless | 1 | mechanical |
| 12 | 420 stainless | 2 | mechanical |
| 13 | 420 stainless | 3 | mechanical |

TABLE III-continued

Sealed Lens/Support Assemblies

| Example | Metal Support | Glass (Table II) | Seal Type |
|---|---|---|---|
| 14 | cartridge brass | 1 | hermetic |

As is evident from a study of the data in Table III, all combinations of metal and glass give at least a durable mechanical seal with the glasses of Table II when integrally molded together in accordance with the Example. However, the realization of a dependable hermetic seal appears to be favored by employing glass-adherent metals of higher expansion coefficient, e.g., brass and austenitic stainless steel supports. We therefore anticipate that glass-adherent steel or brass supports with average expansion coefficients above about $170 \times 10^{-7}/°$ C. ($20°$–$300$ C.), most preferably $175$–$200 \times 10^{-7}/°$ C., will form the best seals with the preferred high expansion alkali phosphate lens glasses.

Figure 3:
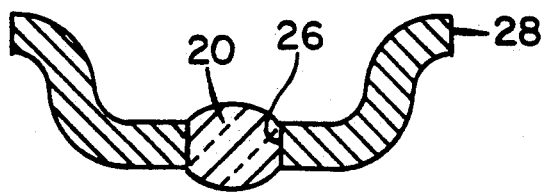
FIGS. 3 and 4 show integral optical assemblies wherein molded glass lenses are sealed to metal supports of alternative designs.
Figure 4:
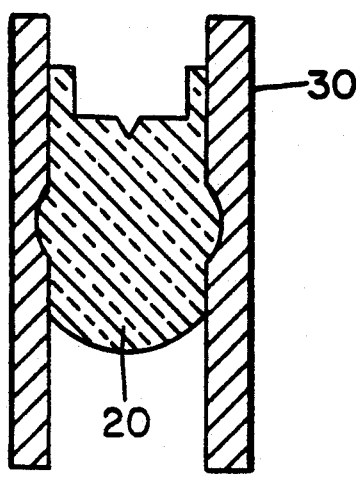

As previously noted, the method of the invention is not restricted to any particular design for the metal support member or glass lens. Rather, these may be adapted to any configuration which may be required for a particular end use. FIGS. 2–4 disclose some of the possible configurations for the metal support, including ring support 22 in FIG. 2, open cup support 28 in FIG. 3, and tubular support 30 in FIG. 4.

Uses for molded lens/support structures provided in accordance with the invention include use as optical sub-assemblies for optical memory disk readers, bar code scanners, hermetically sealed solid state light emitters or detectors, expanded beam connectors for optical fibers, and numerous other products. The hermetic sealing of the lens glass into precise optical alignment with the metal support greatly facilitates the incorporation of the lens/support combination into metal packages for semiconductor lasers, as well as into other optical circuit environments such as optical fiber couplers, connectors or switches where direct sealing of the combination into a ferrule for positioning the end of the fiber in a predetermined exact relationship to the lens is easily accomplished. Accurate and permanent fastening of the sealed assembly to metal packaging by means of laser welding, soldering or the like is especially fast, convenient, and therefore economical.

We claim:

1. An integral optical assembly comprising a molded glass optical element positioned within and forming a seal with a circumferential metal support member, wherein:

the optical element is formed of a glass selected from the group consisting of alkali phosphate, alkali fluorophosphate, alkali aluminophosphate, and alkali fluoroaluminophosphate glasses;

the metal forming the support member has a composition selected from the group consisting of steel and brass; and the seal interface between the glass optical element and the metal support member is substantially free of supplemental organic and inorganic sealing materials.

2. An integral optical assembly in accordance with claim 1 wherein the glass optical element is a lens, wherein the circumferential metal support member is a one-piece support member, and wherein the seal is an hermetic seal.

3. An integral optical assembly in accordance with claim 2 wherein the glass is an alkali fluoroaluminophospahte glass and the metal is austenitic stainless steel.

4. An integral optical assembly in accordance with claim 3 wherein the glass has a softening temperature below 400° C.

5. An integral optical assembly in accordance with claim 3 wherein the metal is a glass-adherent steel or brass which has an average expansion coefficient ($20°$–$300°$ C.) above about $170 \times 10^{-7}/°$ C.

6. An integral optical assembly in accordance with claim 5 wherein the metal is a glass-adherent steel or brass which has an average expansion coefficient ($20°$–$300°$ C.) in the range of about $175$–$200 \times 10^{-7}/°$ C.

7. An integral optical assembly comprising a molded glass lens positioned within and forming a seal with a one-piece circumferential metal support member, wherein:

the metal forming the support member has an average expansion coefficient ($20°$—$300°$ C.) above about $170 \times 10^{-7}/°$ C. and a composition selected from the group consisting of austenitic stainless steel and brass;

the lens is formed of a glass selected from the group consisting of alkali phosphate, alkali fluorophosphate, alkali aluminophosphate, and alkali fluoroaluminophosphate glasses;

the seal is a hermetic seal; and the seal interface between the lens and the support member is substantially free of supplemental organic and inorganic sealing materials.

8. An integral optical assembly in accordance with claim 7 wherein the seal is a non-interlocking seal characterized in that there is no envelopment of any portion of the metal support member by the lens.

* * * * *

UNITED STATES PATENT AND TRADEMARK OFFICE
CERTIFICATE OF CORRECTION

PATENT NO. : 5,274,502
DATED : December 28, 1993
INVENTOR(S) : Jeffrey A. DeMerritt; Mark L. Morrell; Robert V. VanDewoestine It is certified that error appears in the above-indentified patent and that said Letters Patent is hereby corrected as shown below:

Col. 5, line 35, insert "glasses." after "preferred"

Col. 7, line 24, delete "30"

Col. 7, line 24, insert "," after "F"

Col. 10, line 21, "$202 \times 10^{317}/°C$" should be "$202 \times 10^{-17}/°C$"

Col. 12, line 19, "phospahte" should be "phosphate"

Signed and Sealed this

Thirtieth Day of August, 1994

Attest:

Attesting Officer

BRUCE LEHMAN

Commissioner of Patents and Trademarks